(12) United States Patent
Gibbs et al.

(10) Patent No.: US 11,845,485 B2
(45) Date of Patent: Dec. 19, 2023

(54) RAKE ACTUATOR ASSEMBLY FOR STEERING COLUMN AND METHOD OF ASSEMBLY

(71) Applicant: Steering Solutions IP Holding Corporation, Saginaw, MI (US)

(72) Inventors: Christopher W. Gibbs, Bay City, MI (US); Dusten L Dittenbir, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/723,091

(22) Filed: Apr. 18, 2022

(65) Prior Publication Data

US 2023/0331282 A1    Oct. 19, 2023

(51) Int. Cl.
*B62D 1/181*    (2006.01)
*B62D 1/187*    (2006.01)

(52) U.S. Cl.
CPC ............ *B62D 1/181* (2013.01); *B62D 1/187* (2013.01)

(58) Field of Classification Search
CPC ................................ B62D 1/181; B62D 1/187
See application file for complete search history.

(56) References Cited

U.S. PATENT DOCUMENTS

| | | | | |
|---|---|---|---|---|
| 10,228,047 B2 * | 3/2019 | Nunez | ..................... | F16H 25/20 |
| 2007/0290494 A1 * | 12/2007 | Ichikawa | ................. | B62D 1/10 |
| | | | | 74/555 |
| 2018/0281840 A1 * | 10/2018 | Yoon | ...................... | B62D 1/187 |
| 2019/0202495 A1 * | 7/2019 | Rouleau | ............... | B62D 5/0454 |
| 2021/0129894 A1 * | 5/2021 | Ryne | ...................... | B60K 37/06 |
| 2021/0316777 A1 * | 10/2021 | Kwon | ................... | B62D 1/183 |
| 2021/0339792 A1 * | 11/2021 | Kwon | ................... | B62D 1/185 |
| 2021/0380157 A1 * | 12/2021 | Huber | .................... | F16C 17/10 |
| 2022/0097750 A1 * | 3/2022 | Maida | ................... | B62D 1/185 |

FOREIGN PATENT DOCUMENTS

| | | | | | |
|---|---|---|---|---|---|
| EP | 3162655 A1 | * | 5/2017 | ............ | B62D 1/181 |
| KR | 101985875 B1 | * | 7/2012 | | |
| KR | 20120083010 A | * | 9/2019 | | |
| WO | WO-2017139627 A1 | * | 8/2017 | ............ | B62D 1/181 |

* cited by examiner

*Primary Examiner* — Drew J Brown
(74) *Attorney, Agent, or Firm* — Dickinson Wright PLLC

(57) ABSTRACT

A rake actuator assembly for a vehicle steering system includes an electric actuator. The rake actuator assembly also includes a leadscrew driven by the electric actuator. The rake actuator assembly further includes an actuator nut translated along the leadscrew during rotation of the leadscrew. The rake actuator assembly yet further includes a leadscrew housing defining a mounting recess or hole sized to receive a mounting protrusion extending from a mounting structure.

14 Claims, 8 Drawing Sheets

ABSTRACT

RAKE ACTUATOR ASSEMBLY FOR STEERING COLUMN AND METHOD OF ASSEMBLY

FIELD OF THE INVENTION

The present disclosure relates to steering column assemblies and, more particularly, to a de-lashed planar surface pivoting rake actuator assembly and a method of assembling.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire, mechanical connection and autonomous steering capability. These steering system schemes typically include a steering column assembly for translating steering input to an output that interacts with a steering linkage to ultimately cause the vehicle wheels to turn.

Steering column assemblies are provided with features that enable the steering column assembly to be raised or lowered in what is referred to as rake adjustability. Some steering columns require manual rake adjustment, while others utilize an electric actuator to carry out the adjustments. In an electric actuator assembly, an electric actuator provides an output that imparts movement on a rake bracket via a nut-leadscrew arrangement. Movement of the rake bracket adjusts the rake position of the steering column. Prior rake actuator placement on steering columns requires proper actuator nut location on the leadscrew, as well as correct positioning of the rake bracket during assembly. This can lead to longer assembly times and assembly operators needing to "force" actuators into place, potentially causing damage to the components. Therefore, a more reliable, efficient and less costly rake actuator system and installation method would be well received in the industry.

SUMMARY OF THE DISCLOSURE

According to one aspect of the disclosure, a steering column assembly includes a jacket operatively coupled to a mounting structure. The steering column assembly also includes a rake actuator assembly operatively coupled to the jacket and to the mounting structure to adjust a rake position of the jacket. The rake actuator assembly includes an electric actuator. The rake actuator assembly also includes a leadscrew driven by the electric actuator. The rake actuator assembly further includes an actuator nut translated along the leadscrew during rotation of the leadscrew, the actuator nut having a main body surrounding the leadscrew and a retention portion extending from the main body, the retention portion having a retention lug extending radially outward. The rake actuator assembly yet further includes a rake bracket operatively coupled to the jacket and defining a bracket opening, the bracket opening including an access slot sized to receive the retention lug, the retention lug preventing withdrawal of the actuator nut from the bracket opening upon full insertion through the access slot and upon rotation of the actuator nut to misalign the retention lug and the access slot.

According to another aspect of the disclosure, a rake actuator assembly for a vehicle steering system includes an electric actuator. The rake actuator assembly also includes a leadscrew driven by the electric actuator. The rake actuator assembly further includes an actuator nut translated along the leadscrew during rotation of the leadscrew. The rake actuator assembly yet further includes a leadscrew housing defining a mounting recess or hole sized to receive a mounting protrusion extending from a mounting structure.

According to yet another aspect of the disclosure, a method of installing a rake actuator assembly in a steering system is provided. The method includes aligning a plurality of retention lugs of an actuator nut with a first side of a plurality of access slots defined by a bracket opening of a rake bracket. The method also includes inserting the plurality of retention lugs through the plurality of access slots until the plurality of retention lugs are on a second side of the plurality of access slots. The method further includes rotating the actuator nut until the plurality of retention lugs are misaligned with the plurality of access slots to prevent withdrawal of the actuator nut from the rake bracket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
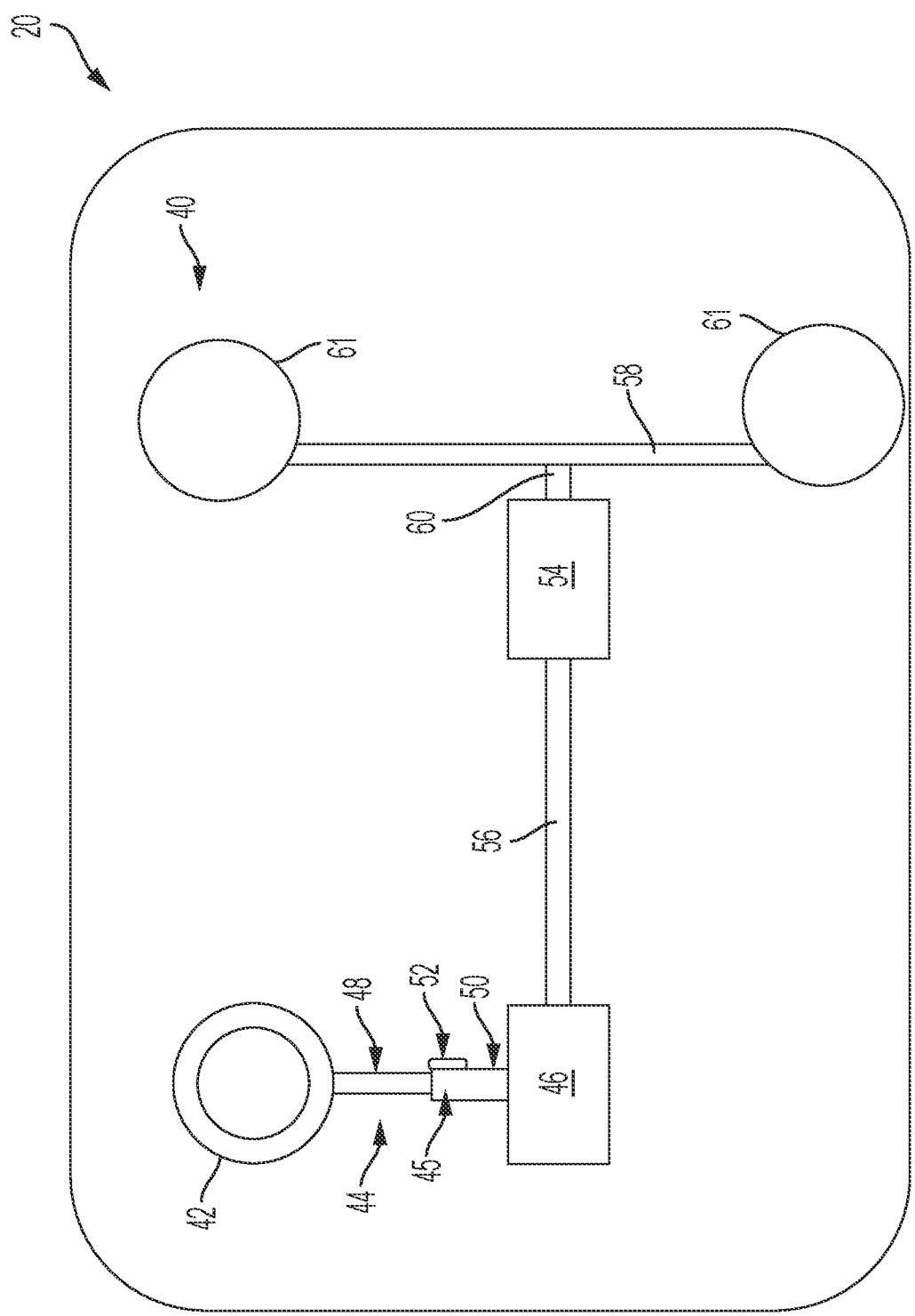
FIG. 1 is a schematic illustration of a vehicle steering system.

Referring initially to FIG. 1, a vehicle 20 is schematically illustrated according to the principles of the present disclosure. The vehicle 20 may be any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other types of vehicles.

The vehicle 20 includes a steering system 40 which may be configured as a driver interface steering system, an autonomous driving system, or a system that allows for both driver interface and autonomous steering. The steering system 40 may include an input device 42, such as a steering wheel, which a driver may utilize to mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any other features conventionally located opposite the input device 42.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axel to turn the wheels 61. It is to be appreciated that a steer-by-wire system may be utilized with the embodiments disclosed herein, such that a mechanical connection is not continuous through the components described above.

The steering column 45 include one or more jackets which surround a steering shaft assembly (not shown). In particular, a single jacket may be provided or multiple jackets may be included. In the illustrated example, two axially adjustable portions are provided, specifically a first jacket 48 and a second jacket 50 that may be axially adjustable with respect to one another. The first jacket 48 may be an upper jacket and a second jacket 50 may be a lower jacket, wherein the first jacket 48 and the second jacket 50 are permitted to move axially with respect to one another in a sliding, telescopic, translating, and/or other axial manner of movement. It is to be appreciated that three or more jackets are contemplated as well. In addition to the axial movement of the jacket(s), the steering column 45 is adjustable in a rake direction, which pivots the steering column 45 about an axis that is substantially perpendicular to the longitudinal axis of the steering column. Rake adjustment changes the vertical position of the steering input device 42. In the illustrated embodiment, the second jacket 50 (e.g., lower jacket 50) is pivoted by a rake actuator assembly 52.

Figure 2:
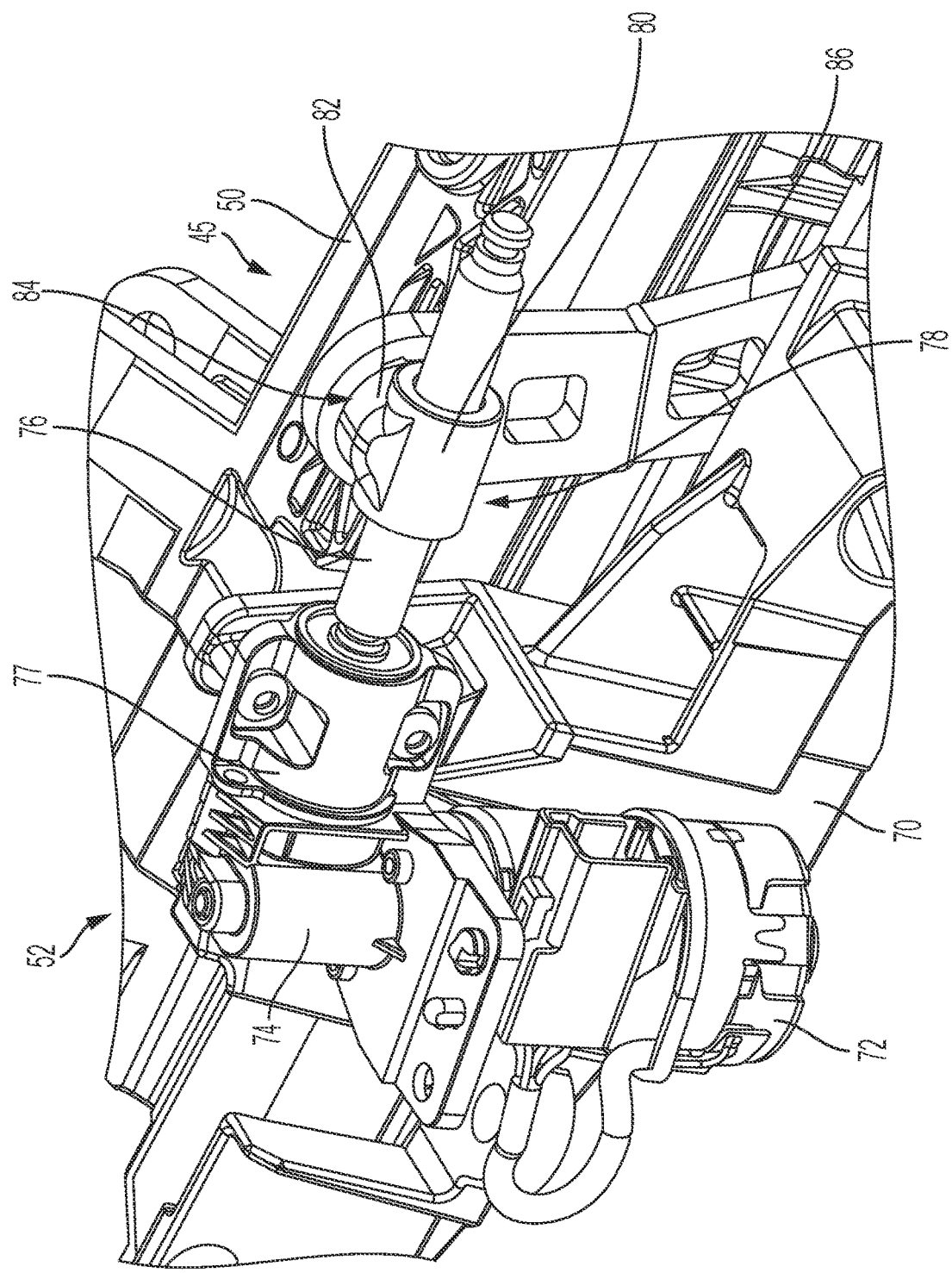
FIG. 2 is a perspective view of a rake actuator assembly for the vehicle steering system in an installed condition.

Referring now to FIG. 2, the rake actuator assembly 52 is shown in detail. In particular, the rake actuator assembly 52 is shown mounted to a mounting structure 70 and a portion of a jacket (e.g., second/lower jacket 50). The mounting structure 70 may be any structure that is stationary relative to the jacket(s), such as a mounting bracket that operatively couples the steering column 45 to the vehicle 20.

The rake actuator assembly 52 includes an electric actuator 72, such as an electric motor of any suitable type. The electric actuator 72 includes an output shaft that is engaged with a gear assembly. The output shaft and the gear assembly are disposed within a housing 74 and are thus not shown. The gear assembly transfers motion of the electric actuator's output shaft to a leadscrew 76, wherein a portion of the leadscrew 76 is disposed within a leadscrew housing 77. Specifically, the leadscrew 76 rotates in response to being driven by the electric actuator 72. Outer threads of the leadscrew 76 are engaged with an inner threading of an actuator nut 78 that is disposed on the leadscrew 76. The actuator nut 78 is a single, integrally formed structure that has a main body 80 and a retention portion 82, with the retention portion 82 extending away from the main body 80. The main body 80 surrounds the leadscrew 76 and at least a portion of the retention portion 82 is disposed within a bracket opening 84 defined by a rake bracket 86. The positioning of the retention portion 82 within the bracket opening 84 prevents the actuator nut 78 from rotating, such that rotation of the leadscrew 76 results in axial movement of the actuator nut 78 in the longitudinal direction of the leadscrew 76. This axial movement of the actuator nut 78 pivots the rake bracket 86 to drive rake adjustment of the steering column 45.

The rake adjustment assembly 52 disclosed herein includes features that assist with the installation process of the rake adjustment assembly 52 when assembling it to the steering column 45, as disclosed herein. Additionally, the rake adjustment assembly 52 provides reliable operation with reduced noise, vibration and harshness.

Figure 4:
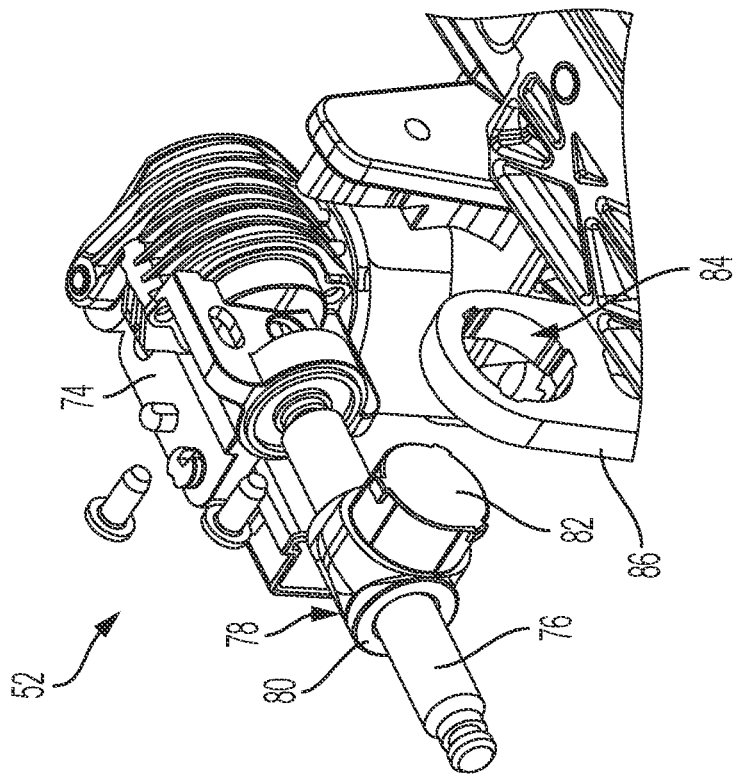
FIG. 4 is a perspective view of a second side of the rake actuator assembly in the first installation process condition.
Figure 3:
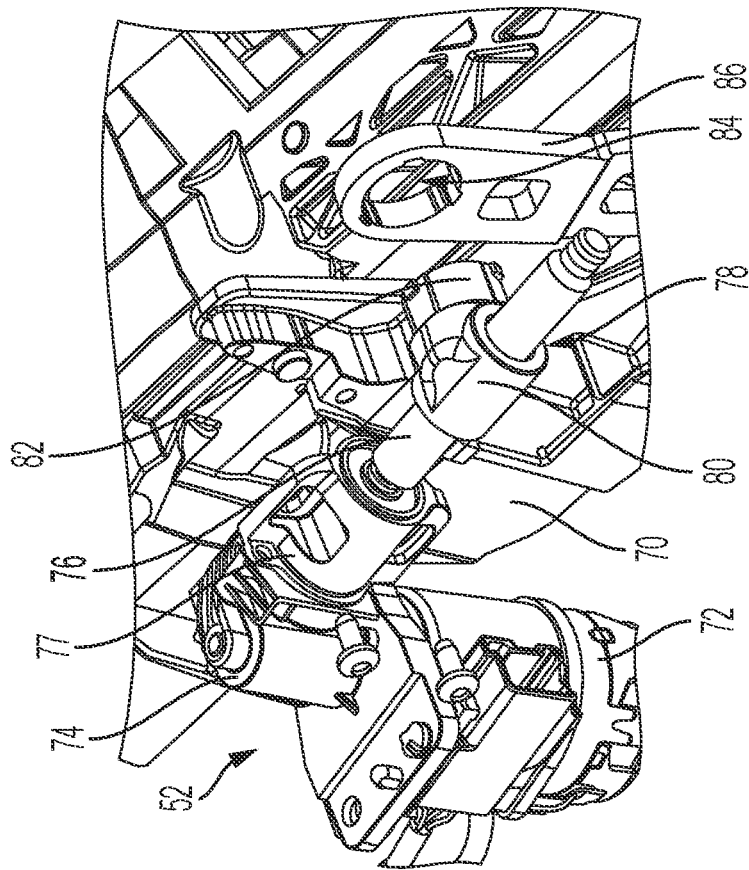
FIG. 3 is a perspective view of a first side of the rake actuator assembly in a first installation process condition.

Referring now to FIGS. 3 and 4, the rake actuator assembly 52 is shown in an initial installation process step. As shown, the electric actuator 72, the housing 74, the leadscrew 76, the leadscrew housing 77 and the actuator nut 78 are already assembled together. Similarly, the rake bracket 86 is already operatively coupled to the jacket of the steering column 45. In the illustrated installation process step, the rake actuator assembly 52 is positioned such that the retention portion 82 of the actuator nut 78 has not yet been inserted into the bracket opening 84 of the rake bracket 86. At this stage, the rake actuator assembly 52 is simply oriented relative to the mounting structure 70 and the bracket opening 84 in an introductory manner in preparation for alignment and assembly.

Figure 6:
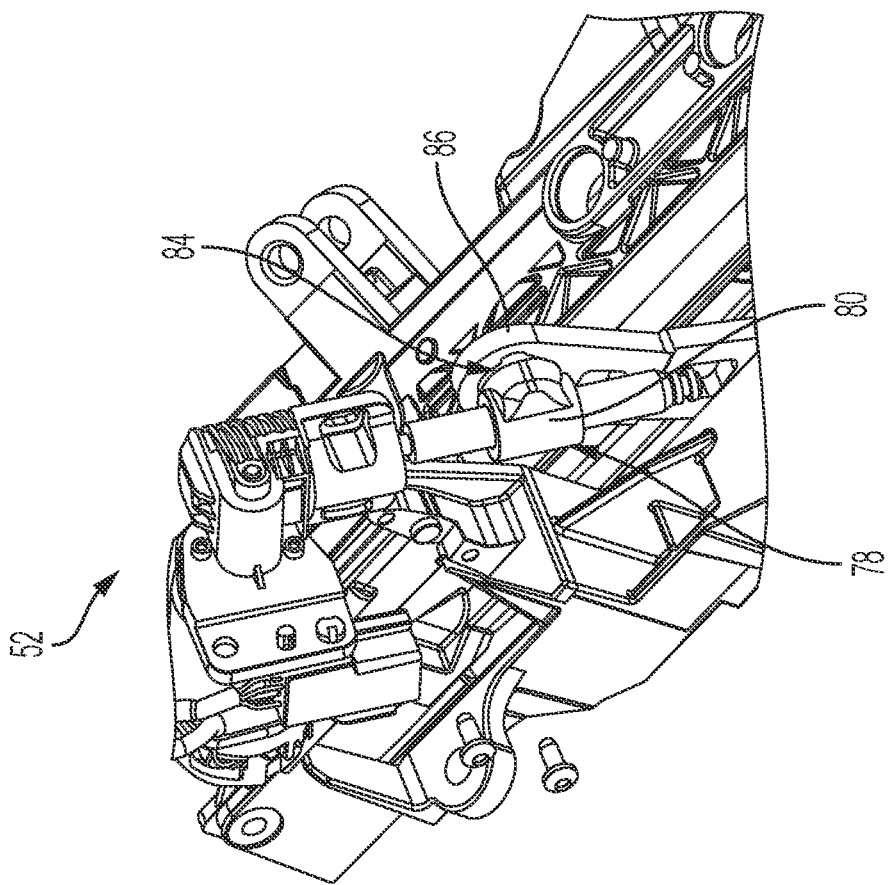
FIG. 6 is a perspective view of the first side of the rake actuator assembly in a third installation process condition.
Figure 5:
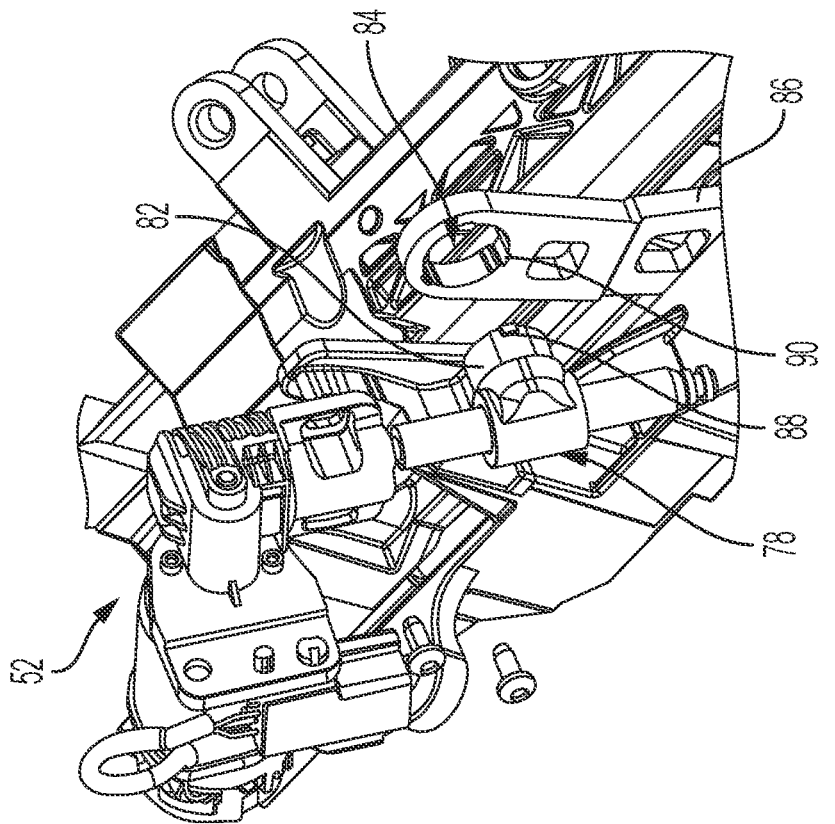
FIG. 5 is a perspective view of the first side of the rake actuator assembly in a second installation process condition.
Figure 7:
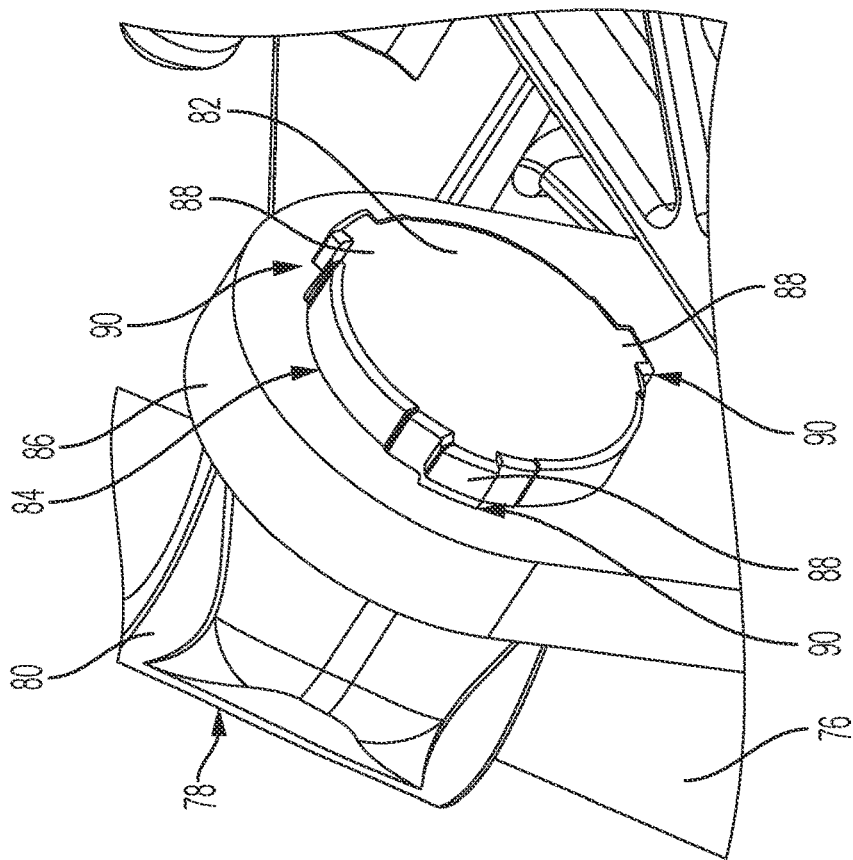
FIG. 7 is a perspective view of a retention portion of an actuator nut inserted into a rake bracket opening at an actuator nut installation process condition.

Referring to FIGS. 5-7, the rake actuator assembly 52 includes at least one retention lug 88 extending radially outwardly from an outer surface of the retention portion 82 of the actuator nut 78. In the illustrated embodiment, three circumferentially spaced retention lugs 88 are provided, but it is to be appreciated that the number of retention lugs may be more or less than that shown and described herein. The bracket opening 84 defines at least one access slot 90. The number of access slot(s) 90 is equal to or greater than the number of retention lugs 88 provided on the retention portion 82 of the actuator nut 78. The access slots 90 extend completely through the rake bracket 86 along an entire distance of the bracket opening 84. The access slots 90 provide more room in the radial direction and are sized to accommodate passage of the retention lugs 88 during installation.

Figure 8:
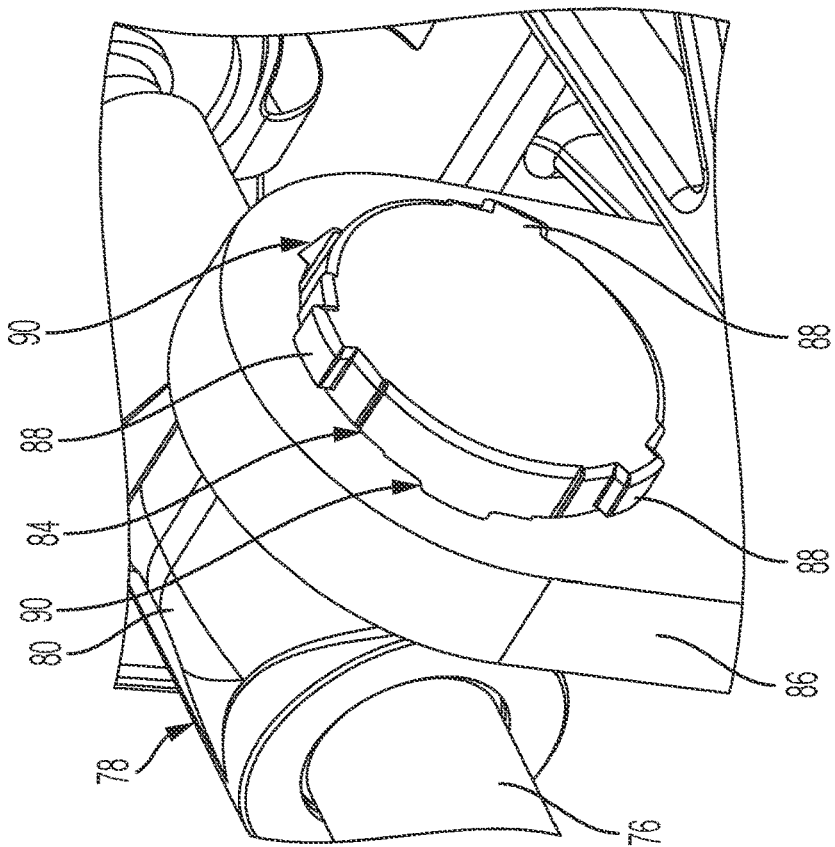
FIG. 8 is a perspective view of the retention portion of the actuator nut rotated to another actuator nut installation process condition.
Figure 10:
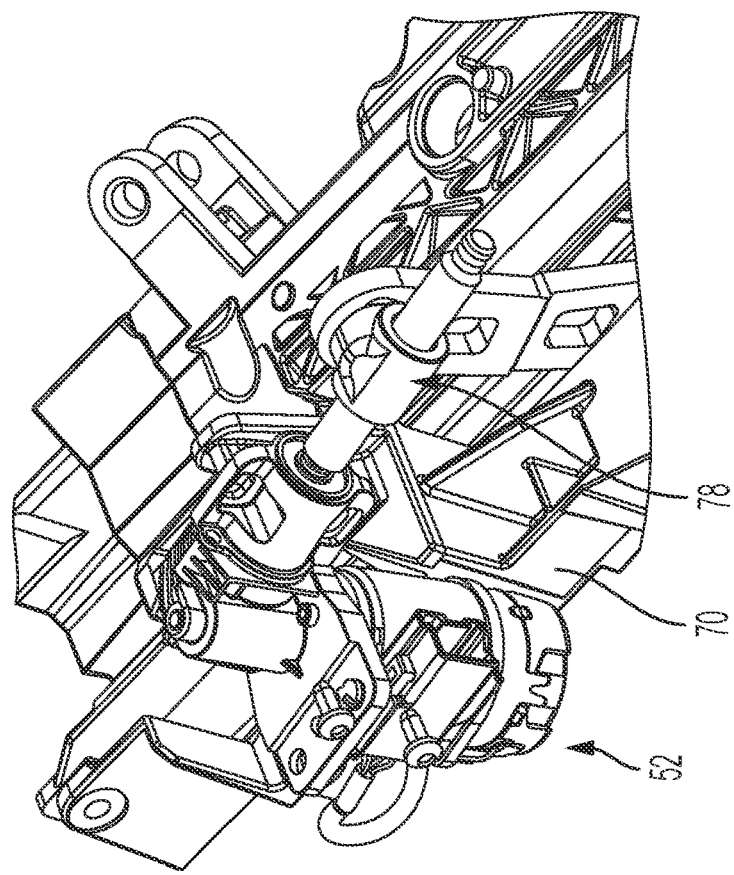
FIG. 10 is a perspective view of the first side of the rake actuator assembly in the fourth installation process condition.
Figure 9:
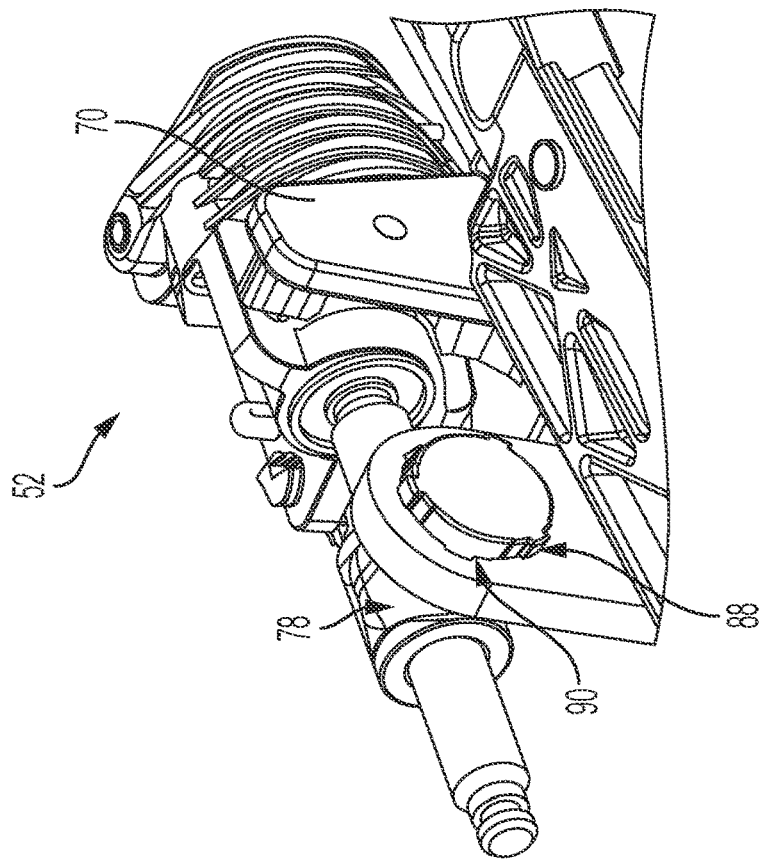
FIG. 9 is a perspective view of the second side of the rake actuator assembly in a fourth installation process condition.

FIG. 5 illustrates the rake actuator assembly 52 prior to insertion of the retention lugs 88 into the access slots 90 of the rake bracket 86. At this stage, the rake actuator assembly 52 is rotated to align the retention lugs 88 with the access slots 90. FIG. 6 shows the retention lugs 88 inserted through the access slots 90 and therefore the retention portion 82 of the actuator nut 78 within the bracket opening 84 of the rake bracket 86. FIG. 7 is an enlarged view of the retention lugs 88 after insertion completely through the access slots 90. In this position, the actuator nut 78 may be withdrawn from the bracket opening 84 since the retention lugs 88 are still aligned with the access slots 90. However, as shown in FIGS. 8-10, rotation of the rake actuator assembly 52 misaligns the retention lugs 88 and the access slots 90. In this position, the actuator nut 78 is prevented from being withdrawn from the bracket opening 84 since the retention lugs 88 are now misaligned with the access slots 90.

With continued reference to FIGS. 9 and 10, the rake actuator assembly 52 is rotated to misalign the retention lugs 88 and the access slots 90, as described above, but an installation operator may struggle to consistently assess how far to rotate the assembly for securement to the mounting structure 70. Therefore, the rake actuator assembly 52 described herein includes a locating feature that eliminates any uncertainty on the part of the installation operator.

Figure 12:
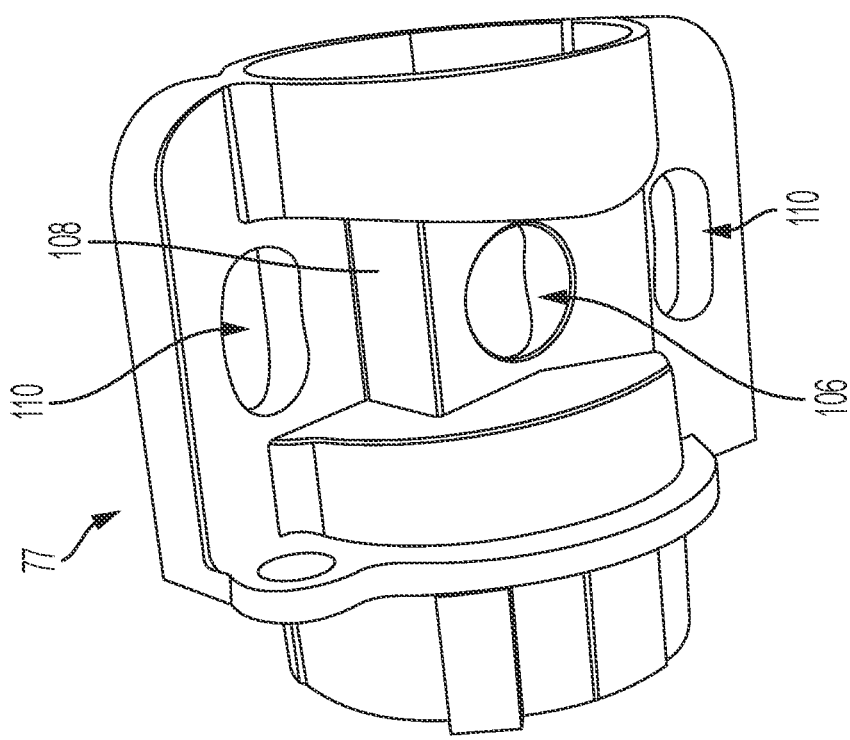
FIG. 12 is a perspective view of a leadscrew housing of the rake actuator assembly.
Figure 11:
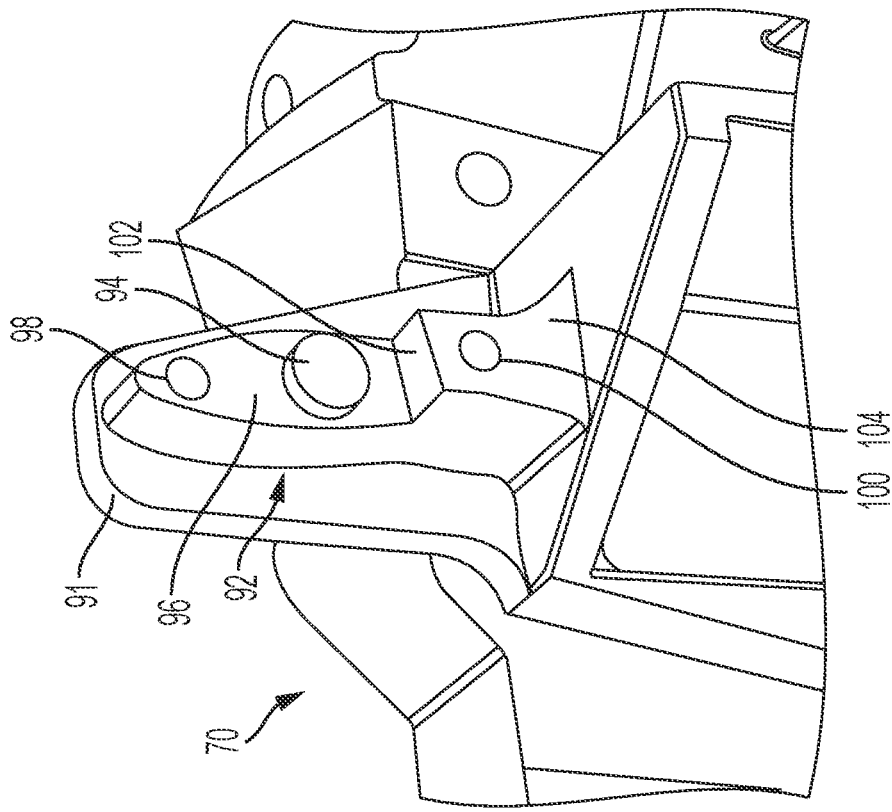
FIG. 11 is a perspective view of a mounting feature for positioning of the rake actuator assembly during installation.

Referring now to FIGS. 11 and 12, a portion of the mounting structure 70 (FIG. 11) and the leadscrew housing 77 (FIG. 12) are shown in greater detail. In particular, a structure extension 91 of the mounting structure 70 is shown in more detail. The structure extension 91 includes a tab 92 extending from a face of the structure extension. The tab 92 includes a mounting protrusion 94 that extends away from a substantially planar surface 96 of the tab 92. The mounting protrusion 94 provides the pivoting axis during normal rake load operation. The tab 92 is nested to the leadscrew housing 77 to provide additional de-lashing functionality and provide high load retention during a crash event where the actuator is resisting the excessive loading by column collapse. The lateral position variation between the planar surface 96 of the tab 92 and the rake bracket surface is accommodated by the actuator nut translating laterally to the rake bracket opening during rake actuations.

A first fastener receiving hole 98 is located in the same plane as the base of the mounting protrusion 94. On an opposite side of the mounting protrusion is a second fastener receiving hole 100, which together with the first fastener receiving hole 98 forms a pair of fastener receiving holes. However, the planar surface 96 terminates and a step feature 102 extends away from the planar surface 96 at a substantially right angle. A second planar surface 104 extends at a right angle from the step feature 102 and includes the second fastener receiving hole 100. Therefore, the pair of fastener receiving holes 98, 100 have respective insertion locations that are staggered by the step feature 102 included on the mounting structure 70.

Figure 13:
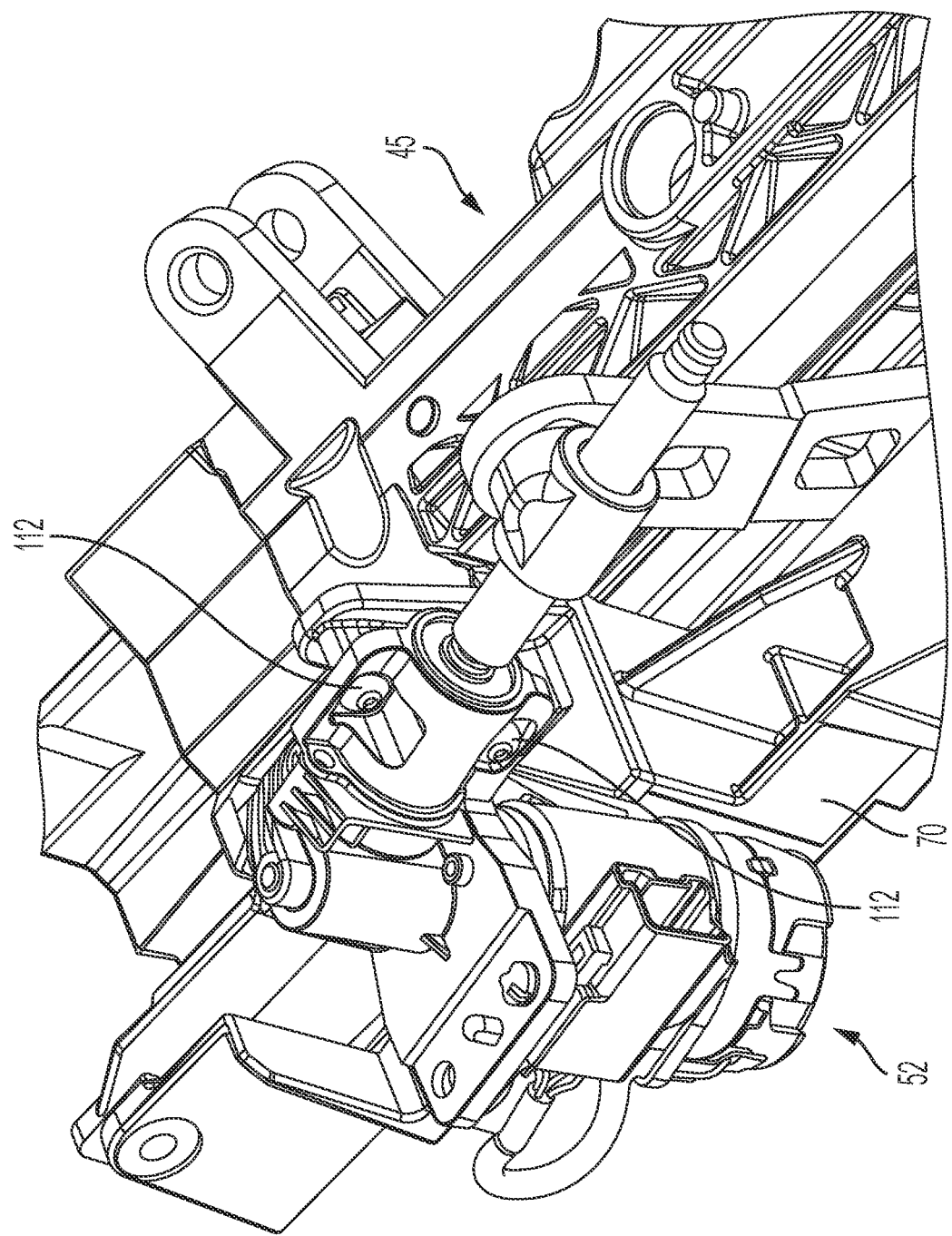
FIG. 13 is a perspective view of a rake actuator assembly for the vehicle steering system in the installed condition.

The leadscrew housing 77 defines a mounting recess or hole 106 sized to receive the mounting protrusion 94 extending from the mounting structure 70 and allows relative pivoting. During installation the rake actuator assembly 52 is rotated until a leadscrew housing step 108 contacts the step feature 102 of the mounting structure 70. Such positioning facilitates insertion of the mounting protrusion 94 in the mounting recess or hole 106 and reliably aligns a pair of fastener apertures 110 with the pair of fastener receiving holes 98, 100 of the mounting structure 70. The pair of fastener apertures 110 are each sized to receive a fastener 112 (FIG. 13). The fasteners 112 does not firmly secure the leadscrew housing 77 to the tab 92, instead only contacting the leadscrew housing fastener pocket recessed surface to keep the housing fully mated with the tab planar surface 96 during rake actuation. The housing 77 moves relatively to the fasteners 112.

FIG. 13 shows the rake actuator assembly 52 in a fully installed condition, relative to the mounting structure 70 and the steering column 45.

The embodiments disclosed herein facilitate faster and more reliable assembly and installation by allowing the operator to place the rake actuator assembly 52 on the rake bracket 86 and rotate it into its mounting location. Additionally, the embodiments of the rake actuator assembly 52 allow for the removal of several pieces of mounting hardware from the steering column assembly which achieves a cost savings.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering column assembly comprising:
   a jacket operatively coupled to a mounting structure; and
   a rake actuator assembly operatively coupled to the jacket and to the mounting structure to adjust a rake position of the jacket, the rake actuator assembly comprising:
      an electric actuator;
      a leadscrew driven by the electric actuator;
      an actuator nut translated along the leadscrew during rotation of the leadscrew, the actuator nut having a main body surrounding the leadscrew and a retention portion extending from the main body, the retention portion having a retention lug extending radially outward; and
      a rake bracket operatively coupled to the jacket and defining a bracket opening, the bracket opening including an access slot sized to receive the retention lug, the retention lug preventing withdrawal of the actuator nut from the bracket opening upon full insertion through the access slot and upon rotation of the actuator nut to misalign the retention lug and the access slot.

2. The steering column assembly of claim 1, wherein the retention lug is one of a plurality of retention lugs and the access slot is one of a plurality of access slots, the number of the plurality of retention lugs and the number of the plurality of the access slots being equal.

3. The steering column assembly of claim 1, wherein the actuator nut is a single, integrally formed structure.

4. The steering column assembly of claim 1, further comprising a leadscrew housing defining a mounting recess or hole sized to receive a mounting protrusion extending from the mounting structure.

5. The steering column assembly of claim 4, wherein the leadscrew housing defines a pair of fastener apertures each sized to receive a fastener.

6. The steering column assembly of claim 5, wherein the mounting structure includes a pair of fastener receiving holes defined therein, the pair of fastener receiving holes located on opposite sides of the mounting protrusion.

7. The steering column assembly of claim 6, wherein the pair of fastener receiving holes have respective insertion locations that are staggered by a step feature included on the mounting structure.

8. A rake actuator assembly for a vehicle steering system comprising:

an electric actuator;

a leadscrew driven by the electric actuator;

an actuator nut translated along the leadscrew during rotation of the leadscrew;

a leadscrew housing defining a mounting recess or hole sized to receive a mounting protrusion extending from a mounting structure;

an actuator nut translated along the leadscrew during rotation of the leadscrew, the actuator nut having a main body surrounding the leadscrew and a retention portion extending from the main body, the retention portion having a retention lug extending radially outward; and a rake bracket operatively coupled to the jacket and defining a bracket opening, the bracket opening including an access slot sized to receive the retention lug, the retention lug preventing withdrawal of the actuator nut from the bracket opening upon full insertion through the access slot and upon rotation of the actuator nut to misalign the retention lug and the access slot.

9. The rake actuator assembly of claim 8, wherein the retention lug is one of a plurality of retention lugs and the access slot is one of a plurality of access slots, the number of the plurality of retention lugs and the number of the plurality of the access slots being equal.

10. The rake actuator assembly of claim 8, wherein the actuator nut is a single, integrally formed structure.

11. The rake actuator assembly of claim 8, wherein the leadscrew housing defines a pair of fastener apertures each sized to receive a fastener.

12. A rake actuator assembly for a vehicle steering system comprising:

an electric actuator;

a leadscrew driven by the electric actuator;

an actuator nut translated along the leadscrew during rotation of the leadscrew; and a leadscrew housing defining a mounting recess or hole sized to receive a mounting protrusion extending from a mounting structure, wherein the mounting structure includes a pair of fastener receiving holes defined therein, the pair of fastener receiving holes located on opposite sides of the mounting protrusion, wherein the pair of fastener receiving holes have respective insertion locations that are staggered by a step feature included on the mounting structure.

13. A method of installing a rake actuator assembly in a steering system, the method comprising:

aligning a plurality of retention lugs of an actuator nut with a first side of a plurality of access slots defined by a bracket opening of a rake bracket;

inserting the plurality of retention lugs through the plurality of access slots until the plurality of retention lugs are on a second side of the plurality of access slots; and rotating the actuator nut until the plurality of retention lugs are misaligned with the plurality of access slots to prevent withdrawal of the actuator nut from the rake bracket.

14. The method of claim 13, further comprising rotating a leadscrew and a leadscrew housing, which are both operatively coupled to the actuator nut, to insert a mounting protrusion extending from a mounting structure into a mounting recess or hole defined by the leadscrew housing to position the rake actuator assembly in a desired installed position.

* * * * *